United States Patent [19]

Suzuki

[11] Patent Number: 4,703,138
[45] Date of Patent: Oct. 27, 1987

[54] PROTECTED SWITCH UNIT FOR CASSETTE TAPE RECORDER

[75] Inventor: Shoji Suzuki, Iwaki, Japan

[73] Assignee: Alpine Electronics Inc., Japan

[21] Appl. No.: 846,574

[22] Filed: Mar. 31, 1986

[30] Foreign Application Priority Data

Mar. 30, 1985 [JP] Japan .............................. 60-47175[U]

[51] Int. Cl.$^4$ ..................... H01H 9/04; H01H 21/08; G11B 1/00
[52] U.S. Cl. ..................... 200/61.58 R; 200/11 DA; 200/11 G; 200/302.1; 360/137
[58] Field of Search .............. 200/11 DA, 11 G, 11 J, 200/11 TW, 38 B, 38 C, 292, 302.1, 52 R, 61.58 R; 360/137

[56] References Cited

U.S. PATENT DOCUMENTS

| | | | |
|---|---|---|---|
| 3,277,739 | 10/1966 | Morse | 200/302.1 X |
| 3,586,797 | 6/1971 | Gerhardt et al. | 200/11 DA X |
| 3,702,383 | 11/1972 | Inaga et al. | 360/85 |
| 3,819,886 | 6/1974 | Homan | 200/38 B |
| 4,206,334 | 6/1980 | La Rock | 200/302.1 X |

Primary Examiner—J. R. Scott
Attorney, Agent, or Firm—Guy W. Shoup

[57] ABSTRACT

A protected switch unit is provided in a cassette tape recorder employing a single motor for driving a power transmission system for transferring a cassette holder and a power transmission system for loading and unloading the tape of the cassette loaded on the cassette tape recorder. The protected switch controls the motor for sequential cassette inserting operation and tape loading operation and for sequential tape unloading operation and cassette ejecting operation. A protective member for protecting the switch unit from dust is interposed between a circuit board having stationary contact terminals and a machine element of the power transmission system, carrying a movable contact terminal so as to seal the switch unit from dust.

3 Claims, 19 Drawing Figures

PROTECTED SWITCH UNIT FOR CASSETTE TAPE RECORDER

BACKGROUND OF THE INVENTION

1. Field of the Invention

The present invention relates generally to a cassette tape recorder such as a cassette video tape recorder and, more specifically, to a protected switch unit protected from dust liable to cause the faulty contact of the contact terminals, for a cassette tape recorder in which a tape loading operation, a tape unloading operation, an operation for engaging the pinch roller with the capstan and an operation for disengaging the pinch roller from the capstan are carried out by the action of a single power means through the control of an electric circuit by the action of the machine elements of a power transmission system of the cassette tape recorder.

2. Description of the Prior Art

In a conventional cassette video tape recorder (abbreviated to "VTR" hereinafter), loading and unloading a cassette are carried out by the action of a loading motor, while engaging and disengaging the pinch roller and the capstan are carried out mechanically through a lever system or the like interlocked with a control button. Such a control button, however, cannot be lightly operated.

In order to improve the accessibility of the conventional VTR, a driving mechanism which engages or disengages the pinch roller and the capstan also through electrical means, such as a small motor or a solenoid, has been proposed. However, such a driving mechanism needs a control unit for sequentially and individually actuating the loading motor, and the small motor or the solenoid at an appropriate timing. The provision of the control unit, and the small motor or the solenoid increases the size and cost of the VTR.

There has been proposed, in order to solve such a problem of the conventional driving mechanism, a driving mechanism provided with neither a small motor or a solenoid and capable of carrying out a loading operation, an unloading operation, engaging the pinch roller and the capstan and disengaging the pinch roller and the capstan with a single loading motor. Furthermore, there has been proposed an arrangement to control the operation of the loading motor of such a driving mechanism through the sliding contact between an electric circuit for driving the loading motor and a machine element of a power transmission system for transmitting the power of the loading motor.

In such an arrangement, in which the operation of the loading motor is controlled through the sliding contact between an electric circuit for transmitting the power of the loading motor and the machine element of the power transmission system, however, it is possible that dust enters the contacts of the switch unit and causes malfunction of the loading motor due to the faulty contact of the contact terminals.

The present invention has been made in view of such problems of the conventional VTR.

Accordingly, it is an object of the present invention to provide a protected switch unit protected from dust which is liable to cause faulty contact between the sliding contact terminals of the switch unit, and capable of surely controlling a single motor for a loading operation, an unloading operation, engaging the pinch roller and the capstan and disengaging the pinch roller and the capstan so that practical reliability of the VTR is improved.

The object of the present invention is achieved by a protected switch unit comprising: a circuit board of a loading motor driving circuit, disposed opposite to one surface of one machine element of a power transmission system for transmitting the power of the loading motor; a movable contact terminal fixed to the surface of the machine element facing the circuit board, so as to be in contact with the circuit formed on the circuit board for switching operatin; and a protective member disposed between the machine element of the power transmission system and the circuit board.

Preferably, the protective member is formed of an insulating material, such as a nonwoven fabric, paper felt, a synthetic resin or pottery.

Placing a protective member between the circuit board and a machine element of the power transmission system, carrying the movable contact terminal, namely, a sliding contact terminal inhibits the dust entering the switch unit, and hence prevents faulty contact between the contact terminals of the switch unit.

The above and other objects, features and advantages of the present invention will become more apparent from the following description of a preferred embodiment thereof taken in conjunction with the accompanying drawings.

DESCRIPTION OF THE PREFERRED EMBODIMENT

The present invention will be described hereinafter with reference to a preferred embodiment thereof in connection with the accompanying drawings.

Figure 13:
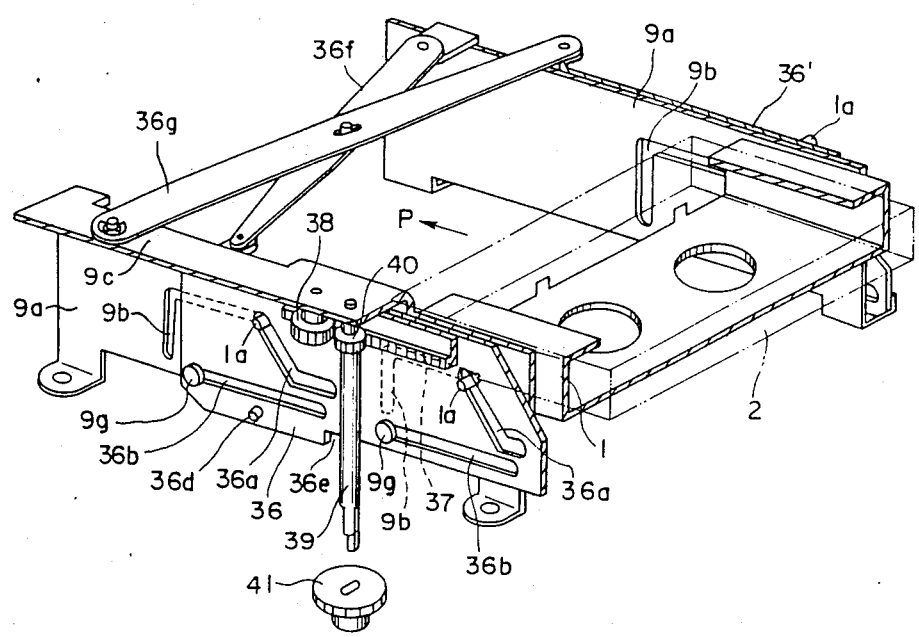
Figure 14:
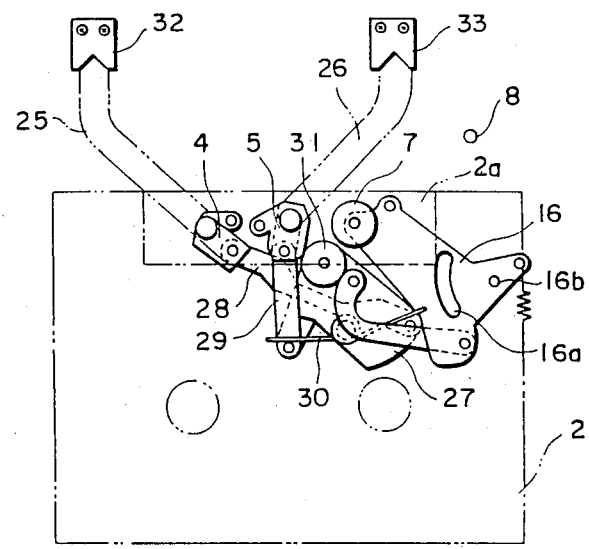
FIGS. 14 and 15 are schematic views of assistance in explaining the loading operation.
Figure 15:
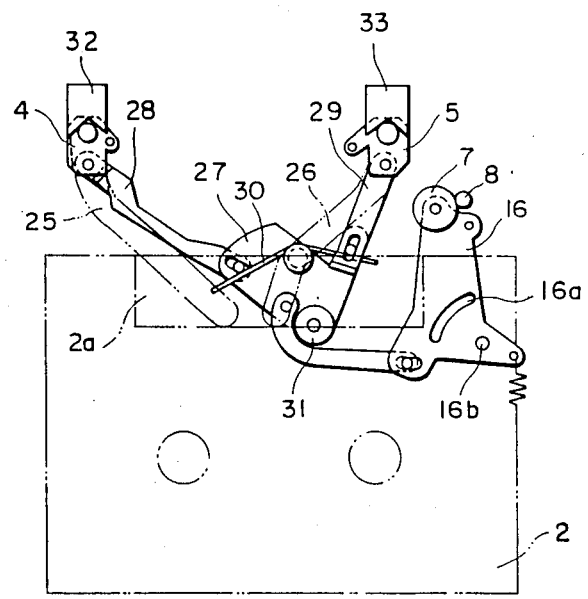

First, a cassette holder transferring operation for transferring a cassette holder 1 and a tape loading operation will be described in connection with FIGS. 13 to 15. Upon the operation of a control button, not shown, after the insertion of a tape cassette 2 into the cassette holder 1, a reversible motor 3 (FIG. 6) is actuated to transfer the cassette holder 1 horizontally in a direction indicated by an arrow P referred to as "P-direction" hereinafter) as illustrated in FIG. 13, and then to transfer the cassette holder 1 vertically downward after the cassette holder 1 has arrived at a suitable horizontal position. Thus the tape cassette 2 is loaded on the VTR. As illustrated in FIG. 14, loading blocks 4 and 5 located in the opening 2a of the tape cassette 2 are moved upward as viewed in FIG. 14 outside the opening 2a of the tape cassette 2 as the reversible motor 3 continues running, to pull out the tape 6 (FIG. 6) for loading. Then, a pinch roller 7 (FIG. 6) is moved to press the tape 6 to a capstan 8 (FIG. 6) to make the VTR ready for recording or reproducing.

The constitution and action of the loading mechanism will be described hereinafter.

Figure 6:
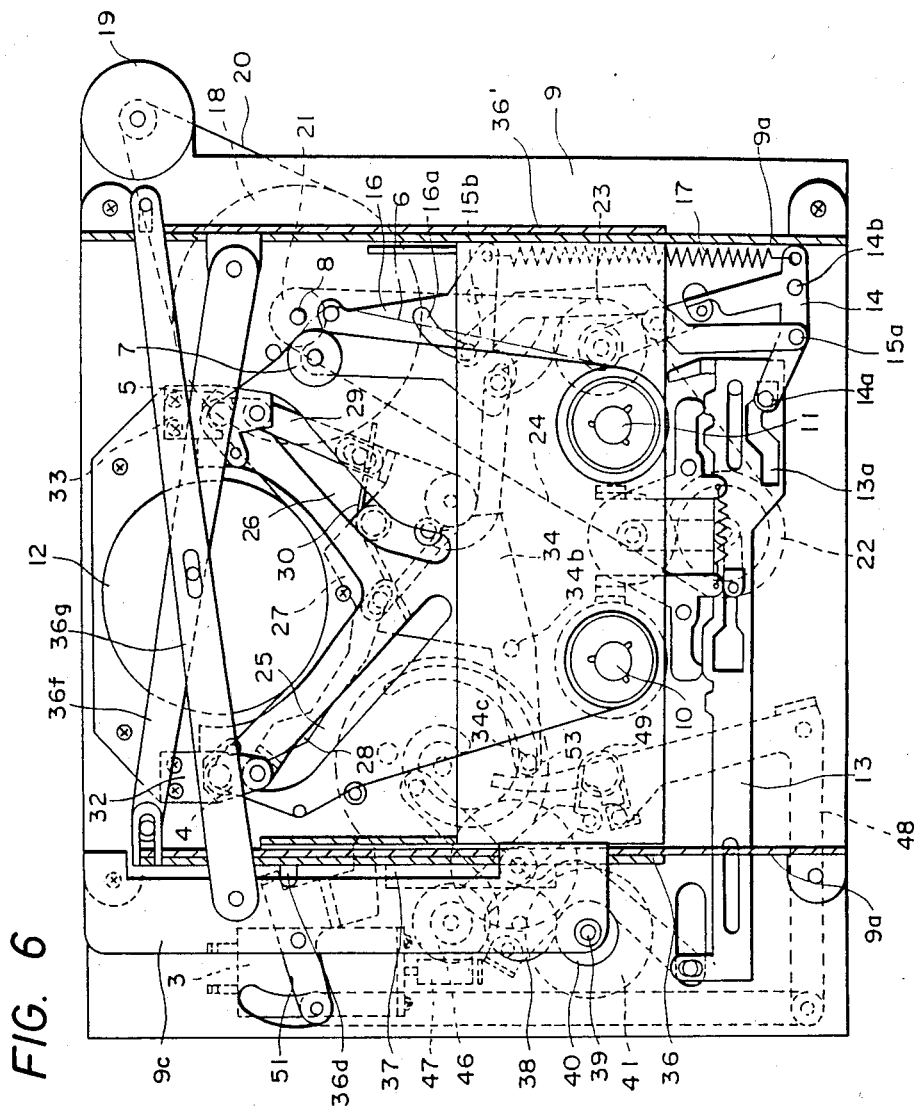
FIG. 6 is a plan view of the VTR of FIG. 5, in which the internal construction is indicated by broken lines.
Figure 7:
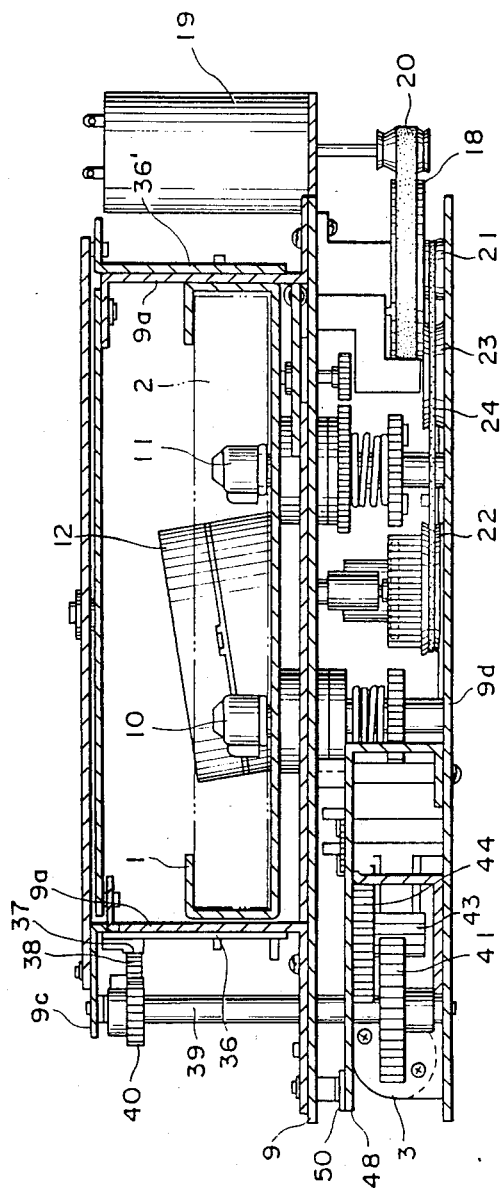
FIG. 7 is a front elevation of the VTR of FIG. 5.
Figure 8:
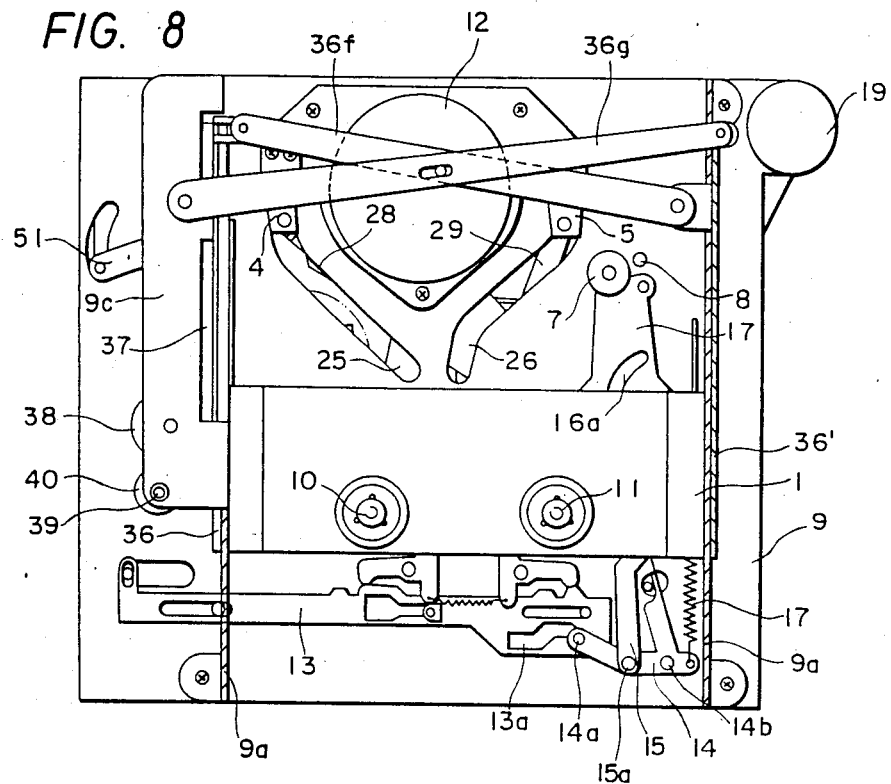
FIG. 8 is a plan view of the VTR of FIG. 5.
Figure 9:
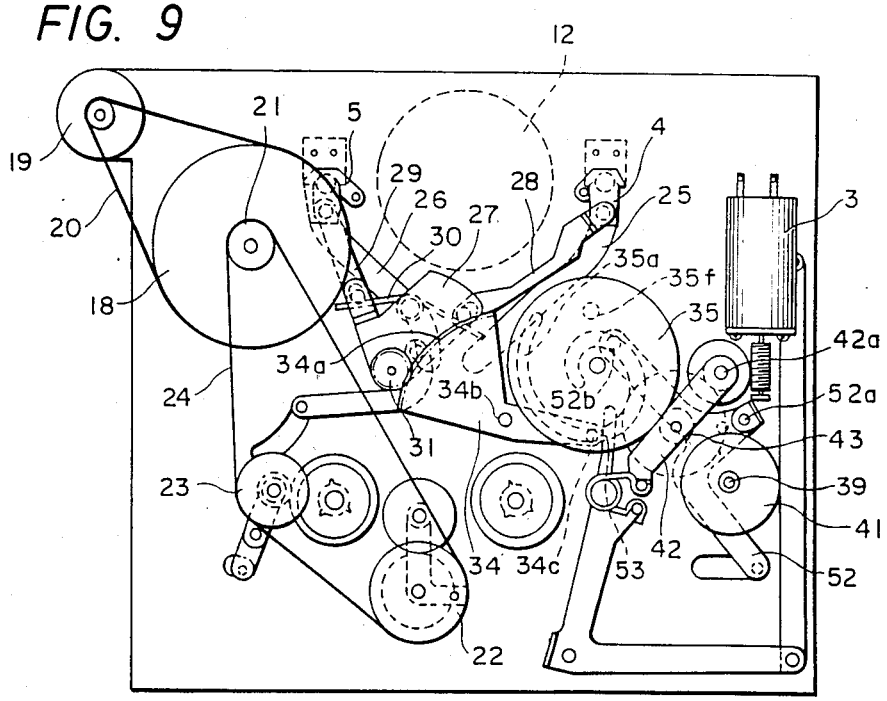
FIG. 9 is a plan view of the VTR of FIG. 5, in which the subchassis is removed.
Figure 10:
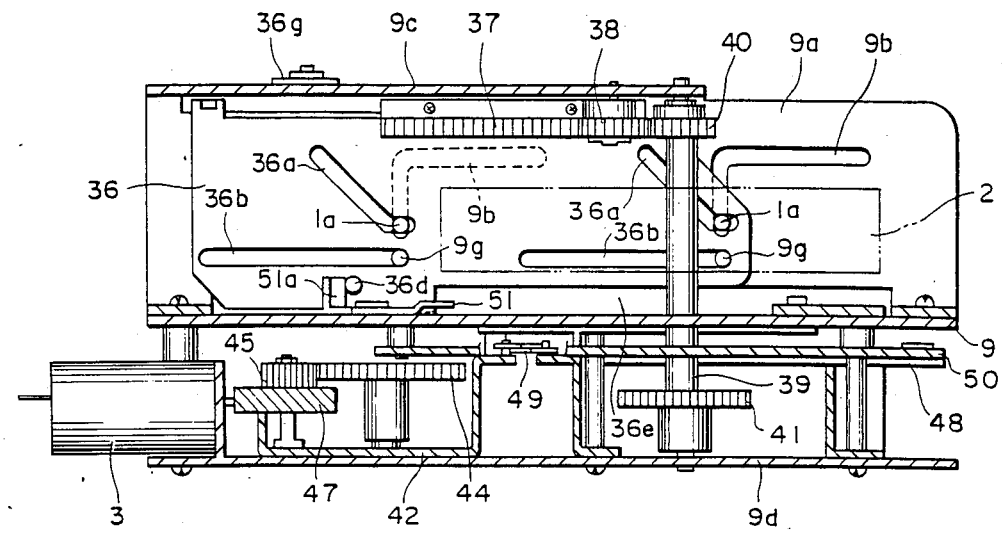
FIG. 10 is a left-hand side elevation of the VTR of FIG. 5.
Figure 11:
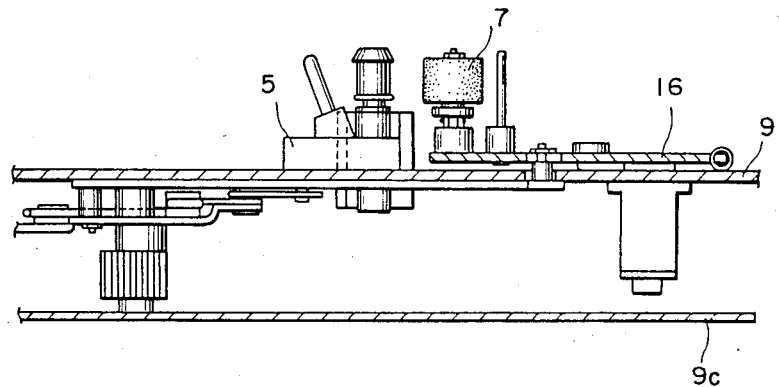
FIG. 11 is a fragmentary sectional view showing the relation between the loading arm and the pinch roller of the VTR of FIG. 5.
Figure 12:
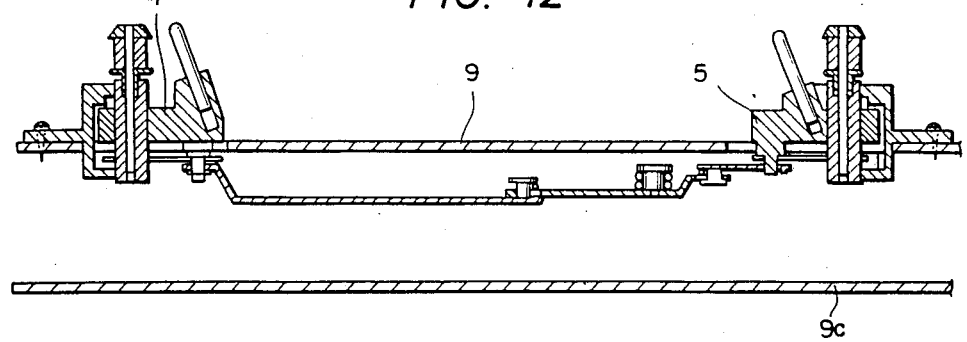
FIG. 12 is a fragmentary sectional view showing the relation between the loading blocks of the VTR of FIG. 5.

A supply reel shaft 10 and a winding reel shaft 11 for winding the tape 6 of the tape cassette 2 loaded on the VTR is provided on a chassis 9. The tape 6 drawn out from the reel put on the supply reel shaft 10 is passed through the loading block 4 a rotary head drum 12, the loading block 5, the pinch roller 7 and the capstan 8 and is wound on the reel put on the winding reel shaft 11. In FIGS. 6 and 8, the tape 6 is stopped, and hence the pinch roller 7 is separated from the capstan 8.

A control plate 13 is mounted laterally slidably, as viewed in FIGS. 6 and 8, on the chassis 9. A pin 14a attached to one end of a lever 14 is fitted slidably in a cam slot 13a formed in the right-hand end of the control plate 13. A connecting plate 15 is joined pivotally to the central portion of the lever 14 with a pin 15a, while the lever 14 is joined pivotally to the chassis 9 with a pin 14b. A pin 15b attached to the free end of the connecting plate 15 is fitted in an arcuate slot 16a formed in a pinch roller supporting plate 16. The pinch roller is supported rotatably on one end of the pinch roller supporting plate 16. A tension coil spring 17 is extended between the other end of the pinch roller supporting plate 16 and the extremity of the lever 14. The pinch roller supporting plate 16 is joined rotatably to the chassis 9 with a pin 16b. Accordingly, when the control plate 13 slides rightward, as viewed in FIGS. 1, 5, 6, 8 and 18, the pin 14a is moved along the cam slot 13a to turn the lever 14 clockwise, as viewed in FIGS. 1, 5, 6, 8 and 18, and thereby the connecting plate 15 is raised. When the connecting plate 15 is raised, the pinch roller supporting plate 16 is released to allow the tension coil spring 17 to turn the pinch roller supporting plate 16 clockwise, whereby the tape 6 is pressed against the capstan 8.

A flywheel 18 is mounted on the shaft of the capstan 8. A belt 20 is extended between a pulley attached to the output shaft of a capstan motor 19 and the flywheel 18 to rotate the capstan 8. A belt 24 is extended between a pulley 21 mounted on the shaft of the capstan 8, a driving pulley 22 supported pivotally on the chassis 9 and a driving pulley 23 to drive the supply reel shaft 10 and the winding reel shaft 11.

The loading blocks 4 and 5 are slidable along guide slots 25 and 26 formed in the chassis 9, respectively. An arm 27 is supported rotatably at the top thereof on the chassis 9. One end of a connecting arm 28 supporting the loading block 4 and one end of a connecting arm 29 supporting the loading block 5 are joined rotatably to one end and to the other end of the arm 27, resepctively. A torsion coil spring 30 is provided practically at the central part of the arm 27 with the opposite ends thereof engaging the pins supporting the connecting arms 28 and 29, respectively. A third loading gear 31 is fixed to the arm 27. Stoppers 32 and 33 for stopping the loading blocks 4 and 5, respectively, are provided at the extremities of the guide slots 25 and 26 respectively.

A sector gear 34 having a second loading gear 34a is supported rotatably on the chassis 9 with a pin 34b. A pin 34c attached to the free end of an arm extending from the boss of the sector gear 34 is fitted slidably in a cam groove 35a formed in a positive motion cam 35.

Figure 4:
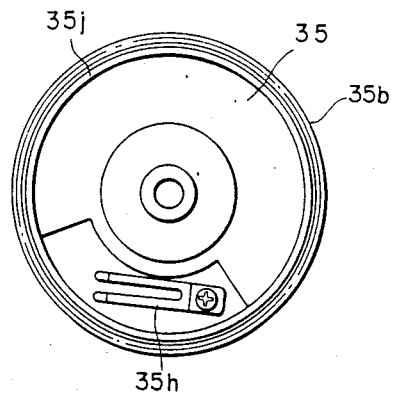
FIG. 4 is a bottom view of the positive motion cam of FIG. 3.
Figure 5:
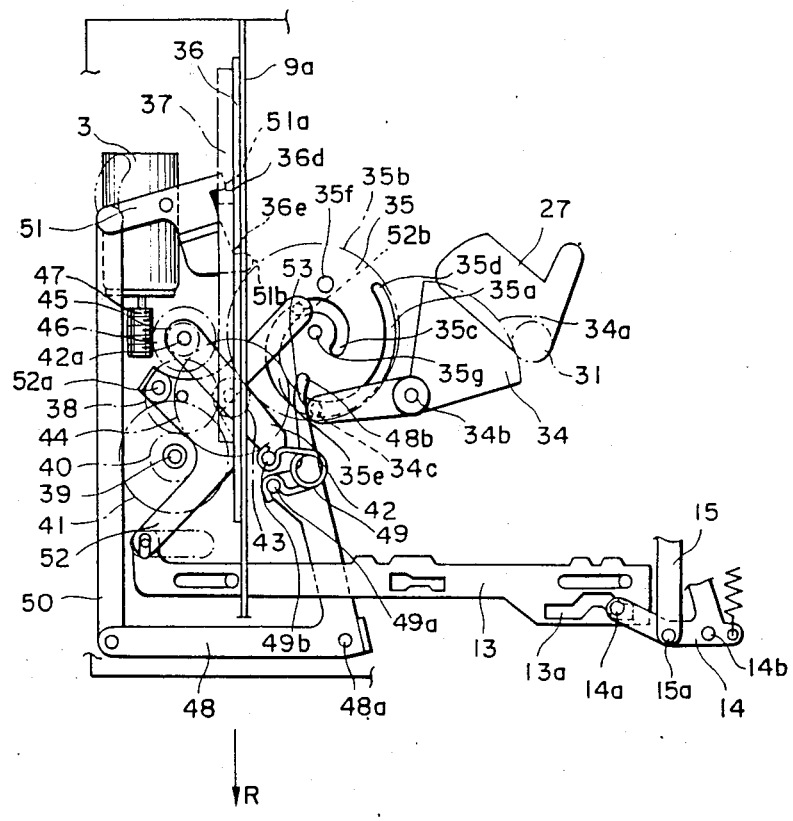
FIG. 5 is a plan view of the power transmission system of a VTR provided with a protected switch unit of the present invention.

The positive motion cam 35 is supported rotatably on the chassis 9 with a pin 35g. A first loading gear 35b is formed in the outer circumference of the positive motion cam 35. As illustrated in FIGS. 4 and 5, the cam groove 35a consists of an inner groove 35c having the shape of an arc of a circle having a smaller radius with its center at the center of the pin 35g and an appropriate length, an outer groove 35d having the shape of an arc of a circle having a larger radius with its center at the center of the pin 35g and an appropriate length, and a connecting groove 35e interconnecting the inner groove 35c and the outer groove 35d. The pin 34c of the sector gear 34 is fitted slidably in the cam groove 35a. The positive motion cam 35 is provided with a stopper 35f projecting from the upper surface of the positive motion cam 35.

Figure 2:
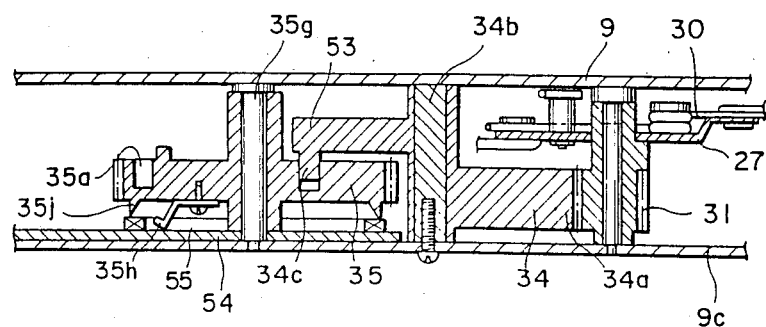
FIG. 2 is a fragmentary sectional view of the protected switch unit of FIG. 1, showing the relation between a positive motion cam and a sector gear.
Figure 3:
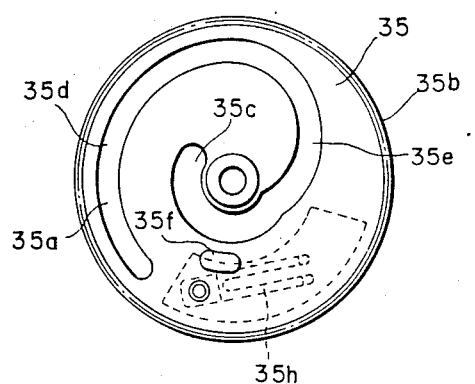
FIG. 3 is a plan view of the positive motion cam of FIG. 2, namely, a machine element of a power transmission system.

As illustrated in FIGS. 2 to 4, a contact terminal 35h is fixed to the lower surface of the positive motion cam 35. As illustrated in FIG. 4, the contact terminal 35h is fixed at the base end thereof to the positive motion cam 35 with a screw 35i and the free end thereof is bifurcated. The bifurcate free end of the contact terminal 35h is in contact with part of the electric circuit formed on a circuit board 54 disposed opposite to the lower surface of the positive motion cam 35. When both the bifurcations of the bifurcate free end of the contact terminal 35h are in contact with the conductors of the circuit, the corresponding circuit is closed, while the circuit is opened when either one of the bifurcation is not in contact with the conductor, for switching operation. The operation of the reversible motor 3 is controlled by the switching motion of the contact terminal 35h.

Figure 1:
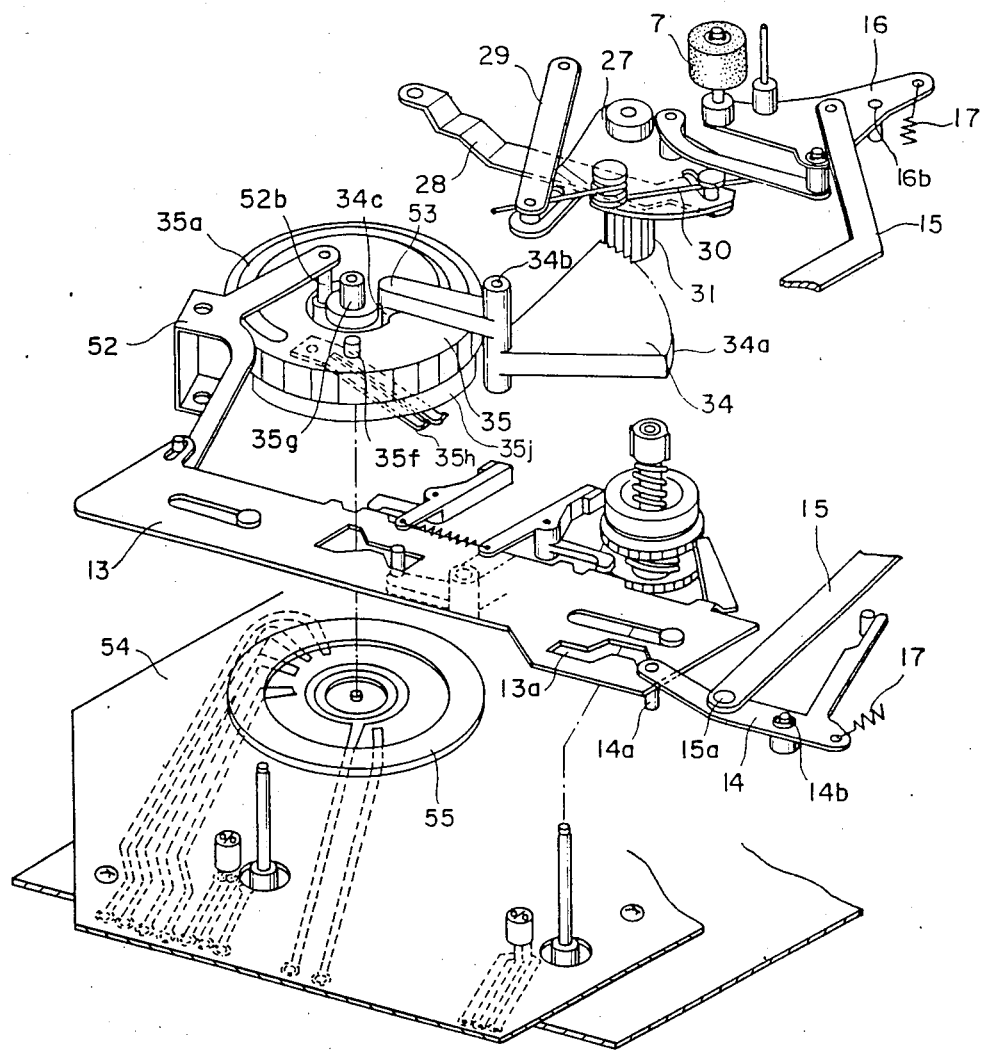
FIG. 1 is an exploded perspective view of an essential portion of a protected switch unit according to the present invention.

In FIGS. 1 and 2, indicated at 55 is a protective member fixed to the circuit board 54 so as to enclose the entire area of movement of the contact terminal 35h. The outer circumference of the positive motion cam 35 is in sliding contact with the protective member 55. In order to reduce the area of contact between the positive motion cam 35 and the protective member 55 to the least possible extent, an annular projection 35j having a sharp extremity is formed so as to project from the lower surface of the positive motion cam 35.

The first loading gear 35b, the positive motion cam 35, the sector gear 34, the second loading gear 34a, the third loading gear 31 and the arm 27 constitute a power transmission system for loading. The constitution of a power transmission system for transferring the cassette holder 1 will be described hereinafter.

As illustrated in FIG. 13, the cassette holder 1 is located between the upright side plates 9a of the chassis 9. Two pins 1a project from one side surface of the cassette holder 1, while one pin 1a projects from the other side surface of the same. The pins 1a are slidably fitted in substantially L-shaped slots 9b formed in the side plates 9a, respectively. Sliding plates 36 and 36' are provided so as to slide along the side plates 9a, respectively. The pins 1a of the cassette holder 1, extending through the L-shaped slots 9b are slidably fitted also in inclined slots 36a formed in the sliding plates 36 and 36', respectively. Pins 9g projecting from the side plates 9a are slidably fitted in elongate slots 36b formed in the sliding plates 36 and 36' to guide the sliding plates 36 and 36' for sliding motion, respectively. A rack 37, namely, a fourth cassette holder transfer gear, is attached to the sliding plate 36. Connecting arms 36f and 36g interlock the sliding plates 36 and 36' for coincident sliding motion. The connecting arm 36f is joined pivotally at one end thereof to the sliding plate 36 having the rack 37 and is joined pivotally at the other end thereof to the side plate 9a adjacent to the sliding plate 36'. The other connecting arm 36g is joined pivotally at one end thereof to the sliding plate 36' not having the rack 37 and is joined pivotally at the other end thereof to the side plate 9a adjacent to the sliding plate 36. A pin 36h attached to the practically middle part of the connecting arm 36f is fitted slidably and pivotally in a slot 36i formed in the practically middle portion of the other connecting arm 36g along the longitudinal direction of the connecting arm 36g.

A third cassette holder transfer gear 38 is supported rotatably on a flange 9c formed by bending the upper portion of the side plate 9a so as to engage the rack 37. A countershaft 39 is extended through the chassis 9 between the flange 9c and a subchassis 9d. A second cassette holder transfer gear 40 is fixed to the upper end of the countershaft 39 so as to engage the third cassette holder transfer gear 38. A first cassette holder transfer gear 41 is fixed to the lower end of the countershaft 39 in level with the first loading gear 35b.

A swing arm 42 is supported pivotally at one end thereof on the chassis 9. A pinion 43 is supported rotatably practically at the middle of the swing arm 42. The pinion 43 is interposed between the first loading gear 35b and the first cassette holder transfer gear 41. The swing arm 42 is turned to make the pinion 43 engage either the first loading gear 35b or the first cassette holder transfer gear 41. An idle gear 44 is fixed to the shaft of the pinion 43, so tha the pinion 43 and the idle gear 44 rotate synchronously. An idle pinion 45 engaging the idle gear 44, and a worm wheel 46 are fixed to the pivotal shaft 42a of the wing arm 42. The worm wheel 46 and a worm 47 fixed to the output shaft of the reversible motor 3 are engaged.

A substantially V-shaped reversing lever 48 is joined pivotally to the chassis 9 with a pin 48a at the bend thereof. A torsion coil spring 49 is loaded between part of the reversing lever 48 and the free end of the swing arm 42. The loading point 49a of the torsion coil spring 49 on the reversing lever 48 can be shifted to a position on the side of the first loading gear 35b and to a position on the side of the first cassette holder transfer gear 41 with respect to a line passing the loading point 49b of the torsion coil spring 49 on the swing arm 42 and the pivotal pin 42a of the swing arm 42. A finger 48b is formed in the reversing lever 48 on the side engaging the torsion coil spring 49 so as to engage the stopper 35f of the positive motion cam 35 or the free end of the arm supporting the pin 34c of the sector gear 34. When the finger 48b and the free end of the arm of the sector gear 34 are engaged as illustrated in FIG. 14, the sector gear 34 is unable to rotate.

A connecting plate 40 is joined rotatably at one end thereof to the other end of the reversing lever 48 and at the other end thereof to a stopping lever 51. The stopping lever 51 is supported pivotally on the chassis 9. A bent portion 51a is formed at one end of the stopping lever 51 so as to engage a projection 36d projecting from the sliding plate 36, while a projection 51b is formed in the other end of the stopping lever 51 so as to be fitted in a recess 36e formed by cutting a portion of the lower edge of the sliding plate 36.

A lever 52 is joined pivotally to the chassis 9 with a pin 52a. One end of the lever 52 is joined pivotally to one end of the control plate 13, while the other end thereof is provided with a pin 52b slidably fitted in the cam groove 35a of the positive motion cam 35. The position of the pin 52b of the lever 52 and that of the pin 34c of the sector gear 34 are decided so that one of the pins 52b and 34c is located in either the inner groove 35c or the outer groove 35d, when the other is located in the connecting groove 35e.

The manner of operation of the power transmission system will be described hereinafter.

Figure 16:
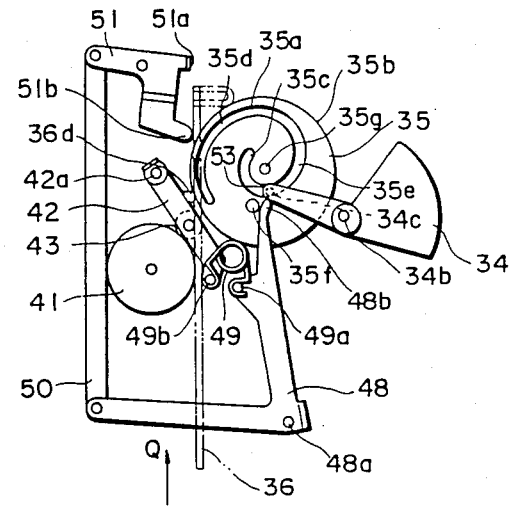
FIGS. 16 and 17 are schematic plan views of assistance in expalining the action of the positive motion cam.

When empty, the cassette holder 1 is located at a position corresponding to the upper portions of the side plates 9a as illustrated in FIG. 13, while the pinion 43 and the first cassette holder transfer gear 41 are engaged as illustrated in FIG. 16. In this state, the loading point 49a of the torsion coil spring 49 on the reversing lever 48 is located on the side of the first loading gear 35b with respect to a straight line passing the loading point 49b of the torsion coil spring 49 on the swing arm 42 and the pivotal pin 42a of the swing arm 42 as illustrated in FIG. 16; consequently, the pinion 43 and the first cassette holder transfer gear 41 are engaged securely by the resilient force of the torsion coil spring 49.

When the control button, not shown, is operated after inserting the tape cassette into the cassette holder 1, the reversible motor 3 starts running in the normal direction to rotate the idle wheel 44 through the worm 47, the worm wheel 46 and the idle wheel 45 engaging the idle wheel 44, and thereby the pinion 43 fixed to the shaft of the idle wheel 44 is rotated. The normal running direction of the reversible motor 3 corresponds to a direction of rotation for rotating the pinion 43 in a counterclockwise direction as viewed in FIG. 16.

As the pinion 43 is rotated counterclockwise, the first cassette holder transfer gear 41 and the second cassette holder transfer gear 40 combined with the former rotate in a clockwise direction, and thereby the third cassette holder transfer gear 38 engaging the second cassette holder transfer gear 40 is rotated in a counterclockwise direction. Since the third cassette holder transfer gear 38 and the rack 37 fixed to the sliding plate 36 are engaged, the sliding plate 36 is moved in a direction indicated by an arrow Q (referred to as "Q-direction" hereinafter), as viewed in FIG. 16, as the third cassette holder transfer gear 38 is rotated counterclockwise, and hence the sliding plate 36' interlocked with the sliding plate 36 through the connecting arms 36f and 36g is moved in the same direction. Accordingly, the cassette holder 1 having the pins 1a slidably fitted in the inclined slots 36a formed in the sliding plates 36 and 36' is moved in the same direction, namely, in the P-direction as viewed in FIG. 13.

During this process for transferring the cassette holder 1, the cassette holder 1 is moved horizontally in the P-direction, as viewed in FIG. 13, while the pins 1a move in the respective horizontal sections of the L-shaped slots 9b formed in the side plates 9a, respectively; and the cassette holder 1 is moved vertically downward after the pins 1a have entered the respective vertical sections of the L-shaped slots 9a, because the pins 1a move downward along the vertical sections as the pins 1a slide along the inclined slots 36a of the sliding plates 36 and 36', respectively. At the end of the downward movement of the cassette holder 1, the supply reel shaft 10 and the winding reel shaft 11 are received in the reels of the tape cassette 2 and the sliding plates 36 and 36' are stopped.

Almost coincidentally with the completion of the cassette holder transferring motion of the sliding plates 36 and 36', the projection 36d projecting from the sliding plate 36 engages the bent portion 51a of the stopping lever 51 to turn the stopping lever 51 counterclockwise, as viewed in FIG. 16, and thereby the projection 51b of the stopping plate 51 is moved into the recess 36e of the sliding plate 36 to check the movement of the sliding plate 36 in a direction opposite the Q-direction, as viewed in FIG. 16. The counterclockwise turning of the stopping plate 51 moves the connecting plate 40 in a direction opposite the Q-direction, as viewed in FIG. 16, and thereby the reversing lever 48 is turned counterclockwise. Consequently, the loading point 49a of the torsion spring 49 on the reversing lever 48 moves over the straight line passing the pin 42a of the swing arm 42 and the loading point 49b of the torsion coil spring 49 on the swing arm 42 to a position on the side of the first cassette holder transfer gear 41, and thereby the pinion 43 and the first loading gear 35b are engaged by the resilient force of the torsion coil spring 49, as illustrated in FIG. 16.

Since the pinion 43 is rotating counterclockwise, the positive motion cam 35 incorporating the first loading gear 35b engaging the pinion 43 is rotated clockwise. However, when the reversing lever 48 is not turned counterclockwise, the finger 48b of the reversing lever 48 is in engagement with the free end of the arm of the sector gear 34 and the pin 34c attached to the free end of the arm is located in the cam groove 34a. Therefore, the positive motion cam 35 is unable to rotate. When the reversing lever 48 is turned counterclockwise to engage the pinion 43 and the first loading gear 35b, the positive motion cam 35 is turned clockwise as viewed in FIG. 16. As the positive motion cam 35 is turned clockwise, the connecting groove 35e of the cam groove 35a moves the pin 34c of the sector gear 34 to turn the sector gear 34 counterclockwise on the pin 34b to a position shown in FIG. 17. The counterclockwise turning of the sector gear 34 causes the arm 27 provided with the third loading gear 31 engaging the second loading gear 34a of the sector gear 34 to turn clockwise as viewed in FIG. 14 so that the torsion coil spring 30 pushes the connecting arms 28 and 29. Consequently, the loading blocks 4 and 5 supported on the connecting arms 28 and 29 are moved upward along the guide slots 25 and 26 as far as the loading blocks 4 and 5 are stopped by the stoppers 32 and 33, respectively. The torsion coil spring 30 presses the loading blocks 4 and 5 against the stoppers 32 and 33, respectively, for loading the tape 6.

Figure 17:
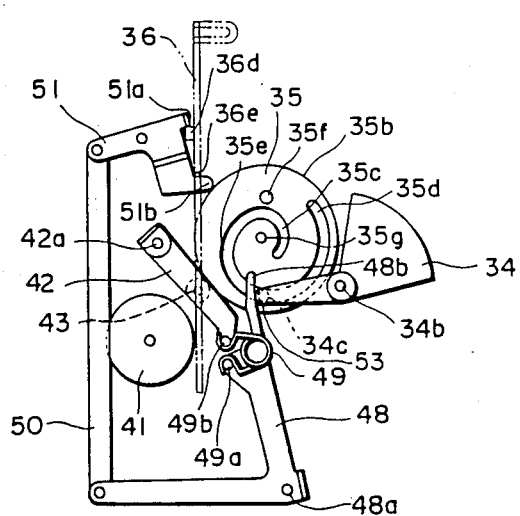
Figure 18:
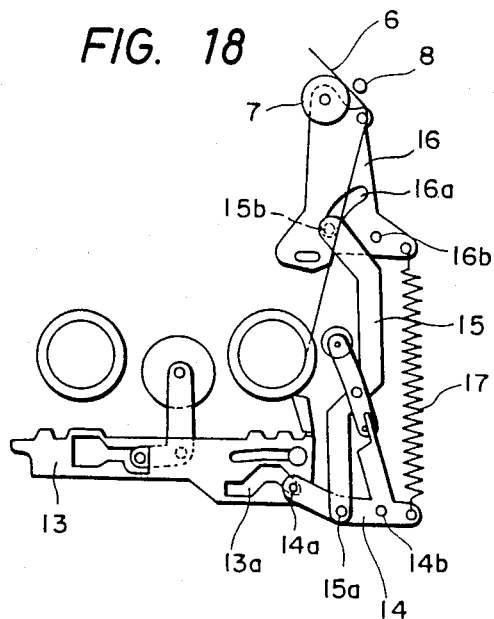
FIGS. 18 and 19 are schematic plan views of assistance in explaining the relation between the pinch roller and the capstan.
Figure 19:
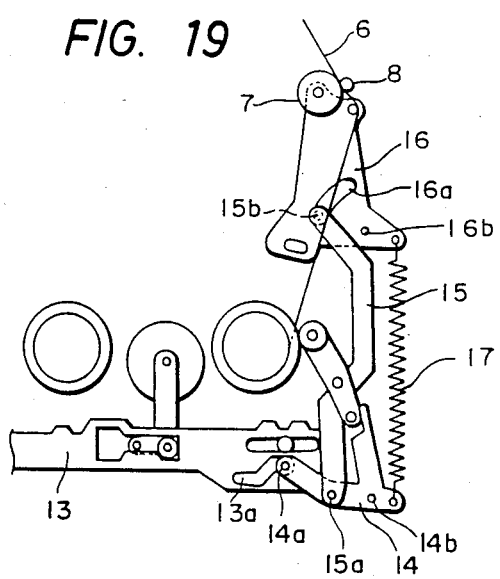

FIGS. 5, 6 and 17 illustrate the relative position of the components of the driving mechanism after the completion of a series of operations for loading the tape 6. The positive motion cam 35 is turned further in a clockwise direction by the pinion 43, as viewed in FIG. 6. Consequently, the connecting groove 35e of the cam groove 35a moves the pin 52b of the lever 52 to turn the lever 52 counterclockwise, as viewed in FIG. 5, on the pin 52a, and thereby the control plate 13 joined pivotally to the lever 52 is moved rightward as viewed in FIG. 5 to press the pinch roller 7 against the capstan 8. Then, the reversible motor 3 is stopped.

While the lever 52 is turned, the pin 34c of the sector gear 34 is located in the outer groove of a circular arc of the cam groove 35a, the sector gear 34 remains stationary. On the other hand, while the pin 34c of the sector gear 34 is located in the connecting groove 35e and the sector gear 34 is turned, the pin 52b of the lever 52 is located in the inner groove 35c of the cam groove 35a, hence, the lever remains stationary. That is, before the insertion of the tape cassette 2, the pin 34c of the sector gear 34 is located in the vicinity of the junction of the inner groove 35c and the connecting groove 35e of the cam groove 35a, while the pin 52b of the lever 52 is located near the end of the inner groove 35c. During the recording operation or the reproducing operation, the pin 34c is located near the end of the outer groove 35d of the cam groove 35a, while the pin 52b is located in the vicinity of the junction of the outer groove 35d and the connecting groove 35e.

When an eject button, not shown, is operated, the reversible motor 3 starts running in the reverse direction to unload the tape 6 and to eject the tape cassette 2 outside the VTR. When the reversible motor 3 runs in the reverse direction, the pinion 43 is rotated clockwise. Since the positive motion cam 35 is turned counterclockwise, as viewed in FIG. 5, when the pinion 43 is rotated clockwise, first, the control plate 13 which has been moved to the right end position is moved leftward to a position shown in FIG. 5, and thereby the pinch roller 7 is separated from the capstan 8. Then, the sector gear 34 is turned clockwise, as viewed in FIG. 5, to turn the arm 27 counterclockwise for unloading operation. Upon the completion of the unloading operation, the stopper 35f of the positive motion cam 35 pushes the finger 48b of the reversing lever 48 to turn the reversing lever 48 clockwise as viewed in FIG. 5. The free end of the arm of the sector gear 34 has been retracted from the path of the reversing lever 48 before the reversing lever 48 is turned clockwise. When the reversing lever 48 is turned, the loading point 49a of the torsion coil spring 49 moves over the straight line passing the pin 42a of the swing arm 42 and the loading point 49b of the torsion coil spring 49 to a position on the side of the positive motion cam 35. Consequently, the pinion 43 is caused to engage the first cassette holder transfer gear 41 by the torsion coil spring 49. In addition, when the reversing lever 48 is turned clockwise, the connecting plate 40 turns the stopping lever 51 clockwise, as viewed in FIG. 5, to retract the projection 51b of the stopping lever 51 from the recess 36e of the sliding plate 36, so that the sliding plate 36 becomes movable. Then, as the pinion 43 rotates clockwise, the third cassette holder transfer gear 38 rotates clockwise to move the sliding plate 36 incorporating the rack 37 engaging the third cassette holder transfer gear 38 in a direction indicated by an arrow R in FIG. 5. Consequently, the tape cassette 2 is ejected through the inversion of a series of the above-mentioned operations for inserting the tape cassette 2; the cassette holder 1 is moved vetically, and the horizontally to eject the tape cassette 2 outside the VTR.

While the positive motion cam 35 is rotated, the contact terminal 36h fixed to the positive motion cam 35 moves in sliding contact with the upper surface of the circuit board 54 for switching to control the mode of operation of the reversible motor 3. Closely interposing the protective member between the positive motion cam 35 and the circuit board 54 inhibits dust to enter the switch unit, whereby the faulty contact between the free end of the contact terminal 35h and the conductor or conductors of the circuit board 54 attributable to dust is prevented.

As apparent from the foregoing description, since the switch unit according to the present invention comprises a circuit board of a loading motor driving circuit, disposed opposite to one surface of one machine element of a power transmission system for transmitting the power of the loading motor, a movable contact terminal fixed to the surface of the machine element facing the circuit board, so as to be in contact with the circuit formed on the circuit board for switching operation, and a protective member disposed between the machine element of the power transmission system and the circuit board, the protective member closely interposed between the circuit board and the machine element for carrying the movable contact terminal inhibits dust entering the switch unit, and hence prevents faulty contact between the contact terminals of the switch unit. Thus, the present invention prevents the accidental malfunction of the VTR, ensures the reliable operation of the VTR, and improves the practical reliability of a VTR equipped with a single motor for a loading operation, an unloading operation, engaging the pinch roller and the capstan and disengaging the pinch roller and the capstan.

Although the invention has been described in its preferred form with a certain degree of particularity, it is to be understood that many changes and variations are possible in the invention without departing from the scope and spirit thereof.

What is claimed is:

1. In a cassette tape recording and reproducing device having a tape loading and unloading mechanism, a reversible rotary motor, and a power transmission system including a rotatable cam for controlling operation of the reversible rotary motor to drive the tape loading and unloading mechanism, the improvement of a protected switch unit comprising:

a contact terminal mounted to one surface of said rotatable cam;

a printed circuit board spaced apart opposite from said one surface of said rotatable cam having a circuit pattern thereon for forming an electrical circuit for operating said reversible rotary motor, said contact terminal being movable with said rotatable cam over a predetermined path of movement and having an extremity end thereof which is conductive and is moved in contact with conductive parts of said circuit pattern so as to provide a switching operation for operating said reversible rotary motor;

a raised annular protective member mounted on said printed circuit board enclosing the area of said path of movement of said end of said contact terminal in contact with said printed circuit board providing said switching operation, said protective member having an annular surface provided in sealing engagement with a depending circumferential edge of the surface of said rotatable cam so as to prevent contamination of the space between said rotatable cam and said enclosed area of said printed circuit board.

2. A protected switch unit for a cassette tape recorder, according to claim 1, wherein said protective member is formed of an insulating material such as a nonwoven fabric, paper felt, a synthetic resin or pottery.

3. A protected switch unit for a cassette tape recorder, according to claim 1, wherein said depending circumferential edge is an annular protuberance having a sharp edge.

* * * * *